(12) United States Patent
Peet

(10) Patent No.: US 10,054,169 B2
(45) Date of Patent: Aug. 21, 2018

(54) FRICTION PLATE INCLUDING MECHANICALLY CONNECTED FRICTION PAPER SEGMENTS

(71) Applicant: Schaeffler Technologies AG & Co. KG, Herzogenaurach (DE)

(72) Inventor: Brian Peet, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 301 days.

(21) Appl. No.: 14/923,200

(22) Filed: Oct. 26, 2015

(65) Prior Publication Data

US 2017/0114838 A1   Apr. 27, 2017

(51) Int. Cl.
*F16D 13/64* (2006.01)

(52) U.S. Cl.
CPC .... *F16D 13/648* (2013.01); *F16D 2250/0061* (2013.01); *F16D 2250/0084* (2013.01)

(58) Field of Classification Search
CPC ........... F16D 13/648; F16D 2250/0061; F16D 2250/0084; F16D 13/38; F16D 13/64
See application file for complete search history.

(56) References Cited

U.S. PATENT DOCUMENTS

| | | | |
|---|---|---|---|
| 4,674,616 A * | 6/1987 | Mannino, Jr. | F16D 13/64 188/264 D |
| 5,337,870 A * | 8/1994 | Hays | F16D 13/64 192/107 C |
| 6,939,427 B1 * | 9/2005 | Anma | F16D 13/64 156/265 |
| 7,249,663 B2 * | 7/2007 | Mordukhovich | F16D 13/648 192/107 M |
| 7,731,005 B2 | 6/2010 | Toya | |
| 7,977,377 B2 * | 7/2011 | Sun | A61K 31/045 514/449 |
| 2006/0180423 A1 * | 8/2006 | Kos | F16H 45/02 192/3.29 |
| 2013/0092499 A1 | 4/2013 | Luipold | |
| 2014/0144747 A1 | 5/2014 | Hemphill et al. | |
| 2014/0326573 A1 * | 11/2014 | Luipold | F16D 13/648 192/107 M |
| 2017/0284478 A1 * | 10/2017 | Jimenez | F16D 13/68 |

* cited by examiner

*Primary Examiner* — David J Hlavka
(74) *Attorney, Agent, or Firm* — Davidson, Davidson & Kappel, LLC

(57) ABSTRACT

A friction plate is provided. The friction plate includes a core plate including a plurality of cutouts extending axially therethrough; a plurality of friction material segments, each of the segments being received in one of the cutouts; and at least one connector affixing the frictional material segments in place in the cutouts to form a mechanical connection between the friction material segments and the core plate. A method of forming a friction plate for a clutch is also provided. The method includes attaching a plurality of friction material segments to a core plate including a plurality of cutouts extending axially therethrough by inserting each of the friction material segments into one of the cutouts and affixing the friction material segments in place with at least one connector to form a mechanical connection between the friction material segments and the core plate.

20 Claims, 3 Drawing Sheets

FRICTION PLATE INCLUDING MECHANICALLY CONNECTED FRICTION PAPER SEGMENTS

The present disclosure relates generally to the friction plates for clutches and specifically to a friction plate with mechanically connected friction paper.

BACKGROUND

Friction plates for use in a clutch are generally manufactured by bonding friction material, often paper-based, to both sides of a steel core plate using an adhesive, often a phenolic resin which is baked in a press. Grooves for cooling oil may be formed in the friction plate by pressing, grinding, or by leaving material out in positions where grooves are desired.

Forming friction plates by bonding friction material to a steel core plate with adhesive may be expensive. The adhesive may cost as much as the friction material itself and the process for handling the adhesive is very sensitive. The adhesive is also flammable and hazardous and therefore requires special handling. Furthermore adhesives may have detrimental environmental impacts. Conditions must be maintained very accurately for each plate or durability and performance problems can occur, such as shudder and delamination, which occurs at the line of adhesive penetration into the friction material, or debonding failures. Using adhesive may also have a negative impact on the clutch environment.

U.S. Pat. No. 7,731,005 describes concentrically arranged friction materials integrally connected to each other. U.S. Pat. Pub 2013/0092499 describes a friction plate with friction paper without the use of adhesives. U.S. Pat. Pub 2014/0144747 A1 describes a friction plate having mechanically connected friction material. U.S. Pat. Pub 2014/0326573 A1 describes a friction plate including connected core plates.

SUMMARY OF THE INVENTION

A friction plate is provided. The friction plate includes a core plate including a plurality of cutouts extending axially therethrough; a plurality of friction material segments, each of the segments being received in one of the cutouts; and at least one connector affixing the frictional material segments in place in the cutouts to form a mechanical connection between the friction material segments and the core plate.

A method of forming a friction plate for a clutch is also provided. The method includes attaching a plurality of friction material segments to a core plate including a plurality of cutouts extending axially therethrough by inserting each of the friction material segments into one of the cutouts and affixing the friction material segments in place with at least one connector to form a mechanical connection between the friction material segments and the core plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The present disclosure provides a friction plate without adhesive bonding while providing a friction plate that will reduce the cost of manufacturing clutch discs while meeting torque and speed requirements without prematurely failing. Instead of adhesive, a mechanical connection is created between the friction material and the core plate. Further, embodiments of invention may allow for the use of thinner friction material by reducing stackup.

Figure 1:
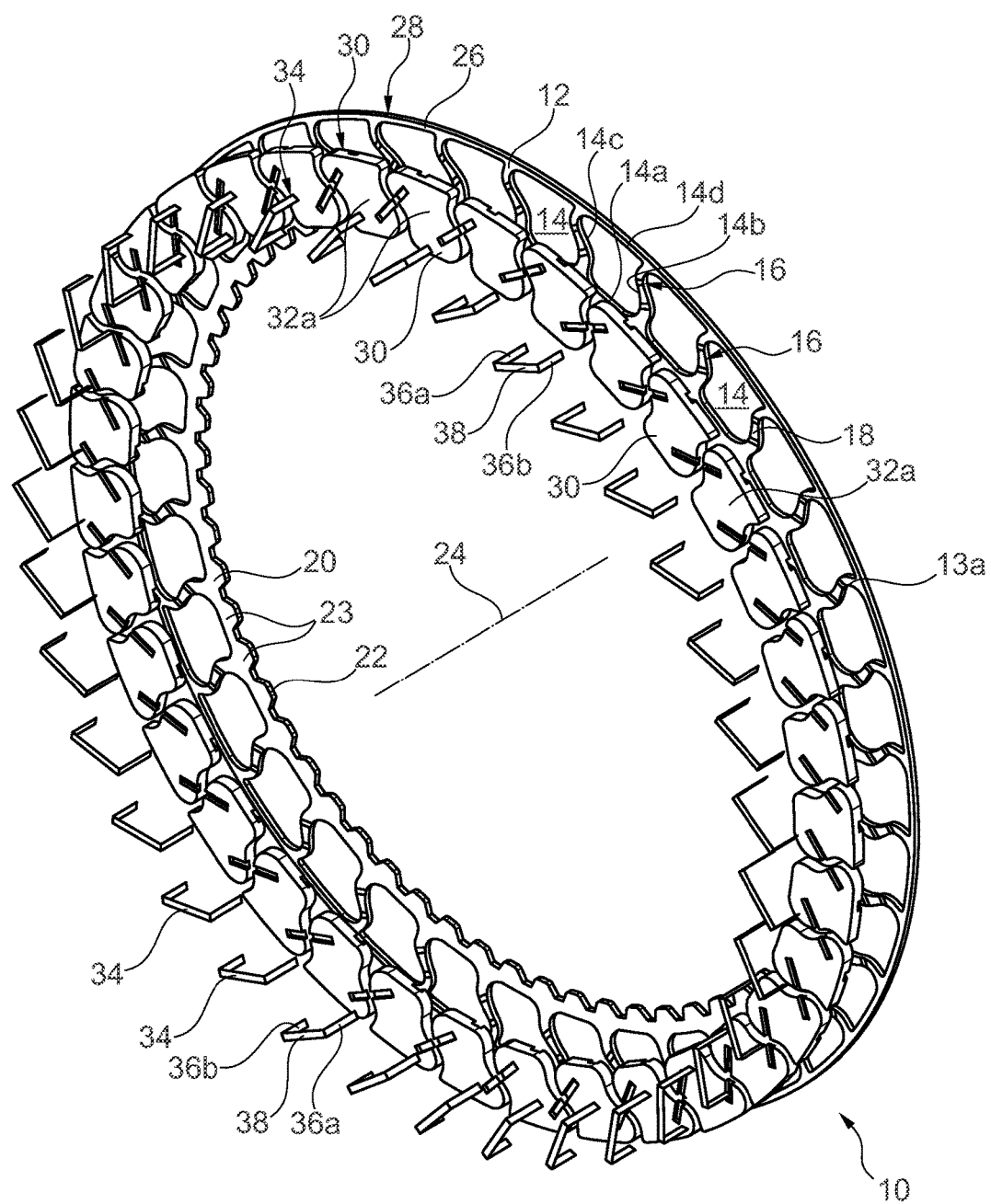
FIG. 1 shows an exploded view of a friction plate according to one embodiment of the present invention.
Figure 2:
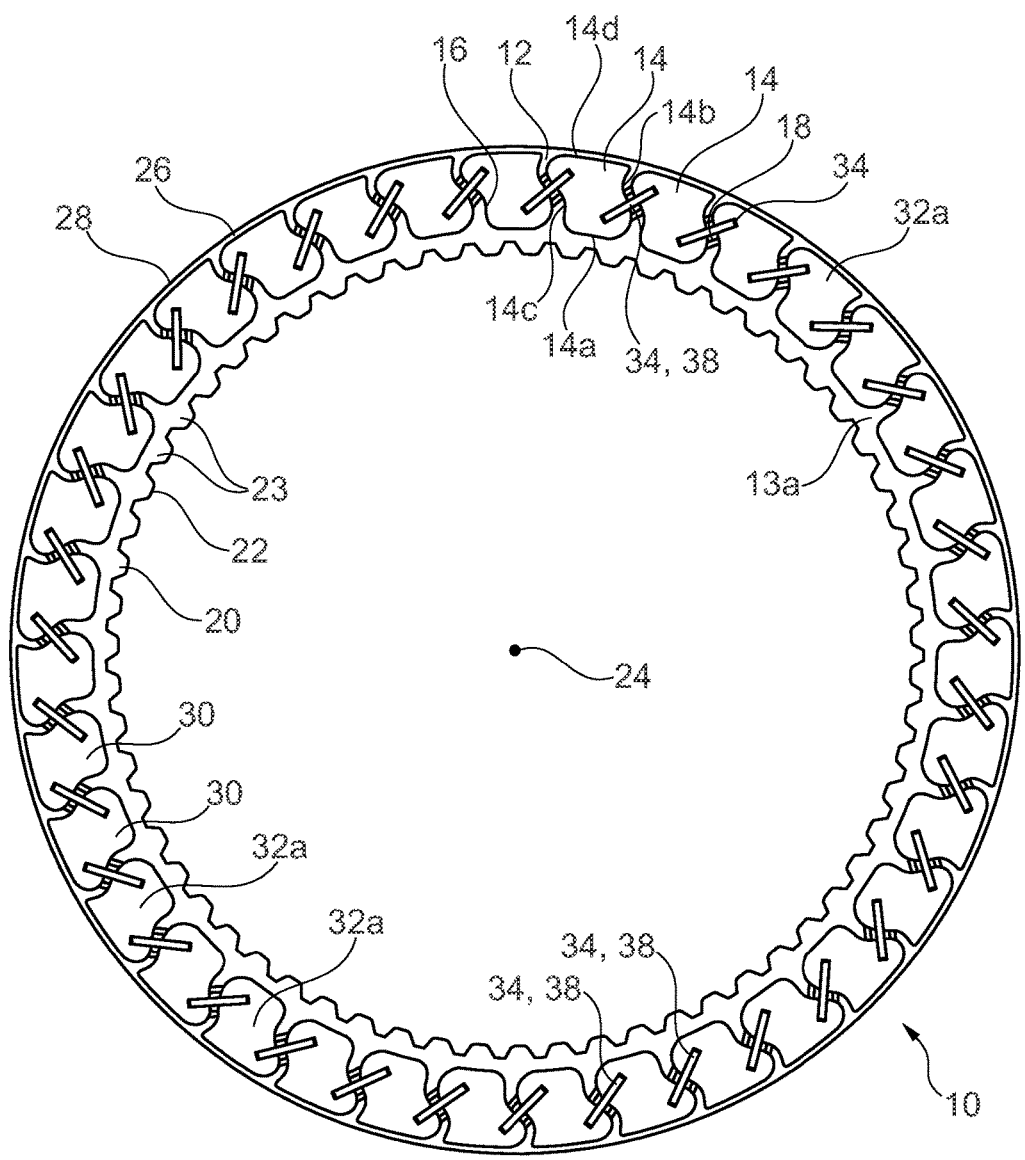
FIG. 2 shows a plan view of a first axial surface of the friction plate shown in FIG. 1.
Figure 3:
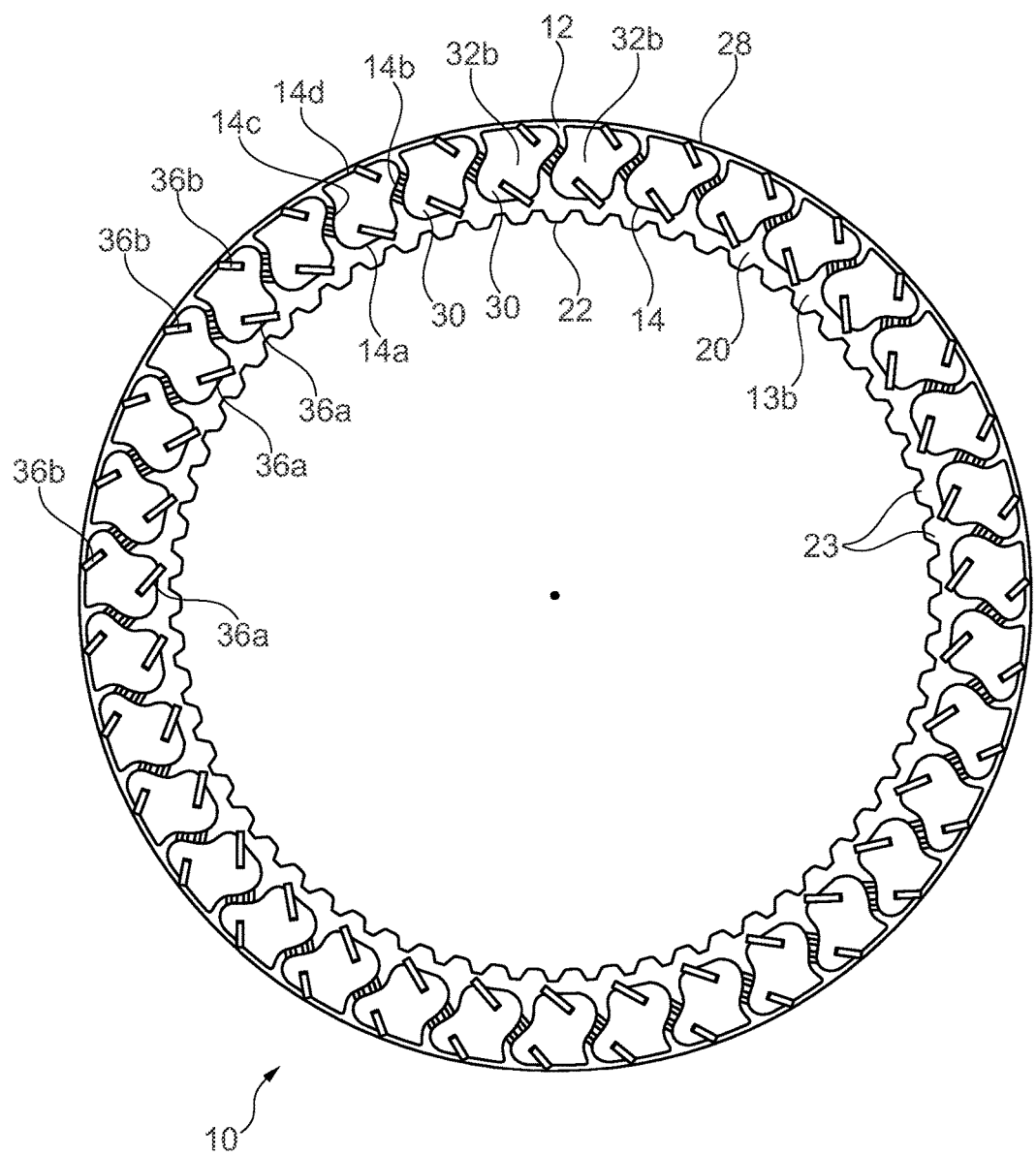
FIG. 3 shows a plan view of a second axial surface of the friction plate shown in FIG. 1.

FIGS. 1 to 3 show a friction plate 10 according to one exemplary embodiment of the present invention. FIG. 1 shows a perspective exploded view, FIG. 2 shows a plan view of a first axial surface of friction plate 10 and FIG. 3 shows a plan view of a second axial surface of friction plate 10 opposite of first axial surface. Friction plate 10 includes a core plate 12, here a steel ring, including a plurality of cutouts 14 extending axially through core plate 12 and a plurality of curved plate core legs 16, each including a recessed groove 18 located circumferentially between two of the cutouts 14. More specifically, each recessed groove 18 extends circumferentially from one cutout 14 to an adjacent cutout 14. The cutouts 14 each have four sides, a radially inner side 14a extending circumferentially, two radially extending sides 14b, 14c extending radially outward from circumferential ends of radially inner side 14a and a radially outer side 14d extending circumferentially between outer radial ends of sides 14b, 14c. In this embodiment, cutouts 14 are identical and repeating and sides 14a, 14d follow substantially straight circumferential paths, while sides 14b, 14c, extending from side 14a, follow a curved path that is convex then concave. In the embodiment shown in FIGS. 1, 2, cutouts 14 are curved rectangular cutouts because the transitions between the adjacent sides are curved.

Core plate 12 includes a radially inner ring 20 including a radially inner surface defining a splined inner circumferential surface 22 of core plate 12, which includes a plurality of teeth 23 extending radially inward toward a center axis 24 of friction plate 10, and a radially outer surface defining sides 14a of cutouts 14. Core plate 12 further includes a radially outer ring 26 including a radially outer surface defining a smooth outer circumferential surface 28 of core plate 12 and a radially inner surface defining sides 14d of cutouts 14. Core plate legs 16 extend radially outward from radially inner ring 20 to radially outer ring 26 to define sides 14b, 14c of cutouts 14.

Friction material is provided in core plate 12 as a plurality of identical repeating friction material segments 30, which in this embodiment are formed of friction paper. Each of the plurality of friction paper segments 30 match the size and shape of the outer contour of the plurality of cutouts 14. Each of the segments 30 is inserted into one of the plurality of cutouts 14. Friction paper segments 30 each include a first axially facing friction surface 32a (FIGS. 1 and 2) and a second axially facing friction surface 32b (FIG. 3) on an axially opposite side of segment 30. After the plurality of friction paper segments 30 are inserted into the cutouts 14, the segments 30 are mechanically connected and axially affixed in place inside the cutouts 30 through the use of a plurality of connectors, which in this embodiment are staples 34. Each of the plurality of staples 34 has two staple legs 36a, 36b and a staple head 38 connecting the legs 36a, 36b. The staples 34 are mechanically connected to the friction paper segments 30 and the core plate 12 by passing staple legs 36a, 36b through adjacent friction paper segments 30 and seating staple head 38 into the recess leg groove 18 thereby allowing staple head 38 to sit flush with a first axial surface 13a (FIGS. 1, 2) of the core plate 12. More specifically, for each staple 34, a first leg 36a pierces a first segment 30 and the second leg 36b pierces a second segment 30 adjacent to the first segment 30. Then, the staple head 38 is seated into the recess leg groove 18 extending circumferentially from the cutout 14 in which the first paper segment 30 is received to the adjacent cutout 14 into which the second paper segment 30 is received in. One installed, each staple head 38 extends circumferentially and radially from a first radially inner leg 36a to the second radially outer leg 36b, which is radially outside of and circumferentially offset from the first leg 36a. Each staple head 38 extends across one side 14b of one cutout 14 and one side 14c of another adjacent cutout 14. Each friction material segment 30 is pierced by a single leg 36a of a first staple 34 and a single leg 36b of a second staple 34.

As shown in FIG. 3, upon piercing through segments 30, legs 36a, 36b are bent to extend parallel to head 38 and flattened against a second axial surface 13b of core plate 12 opposite of first axial surface 13a (FIGS. 1, 2). During the bending, legs 36a, 36b are pressed axially into second axially facing friction surface 32b. Radially inner leg 36a of each staple 34 extends radially across radially inner side 14a of the cutout 14 holding a first segment 30 and a radially outer leg 36b of each staple 34 extends radially across radially outer side 14d of the cutout 14 holding a second segment 30 adjacent to the first segment 30. Accordingly, as shown in FIG. 3, second axially facing friction surface 32b of each segment 30 receives two staple legs—one leg 36a of one staple 34 and one leg 36b of another staple 34.

When segments 30 and staples 34 are installed into cutouts 14, segments 30 axially protrude past first axial surface 13a, and axially protrude past second axial surface 13b of core plate 12, for example by at least 0.3 mm. Legs 36 are recessed below second axially facing friction surface 32b and heads 38 are recessed below first axially facing friction surface 32a. Each of the segments 30 is held radially in place by the sides 14a to 14d of the respective cutout 14 and held axially in place by the respective staples 34. Upon installation, each friction paper segment 30 is axially inserted into one cutout 14 and is affixed in place by staples 34 that axially traverse the friction paper segment 34 and core plate 12. The affixing permanently aligns the core plate 12 and friction paper segments 30 together and restrains the movement of the friction paper segments 30 under spinning and load conditions during use.

In one preferred embodiment, the staple head 38 is recessed 0.3 mm below the friction surface 32 of the plurality of friction paper segments 30. In this embodiment the recess leg groove 18 is sufficiently recessed to allow the staple head 38 to seat in the groove 18 and recessed 0.3 mm below the surface 32 of the plurality of friction paper segments 30. In the embodiment shown in FIGS. 1 and 2, the cutouts 14 in core plate 12 advantageously allow the use of thinner friction paper by reducing stackup.

In the preceding specification the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A friction plate for a clutch comprising:
   a core plate including a plurality of cutouts extending axially therethrough;
   a plurality of distinct and separate friction material segments, each of the segments being received in one of the cutouts; and
   at least one connector affixing the frictional material segments in place in the cutouts to form a mechanical connection between the friction material segments and the core plate.

2. The friction plate as recited in claim 1 wherein the core plate is a metal ring.

3. The friction plate as recited in claim 1 wherein the at least one connector is a plurality of staples.

4. The friction plate as recited in claim 3 wherein each of the staples includes a head, a radially inner leg and a radially outer leg, each of the staple heads extending circumferentially and radially from the radially inner leg to the radially outer leg.

5. The friction plate as recited in claim 1 wherein the core plate includes a radially inner ring, a radially outer ring and a plurality of legs extending radially from the radially inner ring to the radially outer ring, the radially inner ring, a radially outer ring and the legs defining the cutouts.

6. The friction plate as recited in claim 5 wherein the at least one connector is a plurality of connectors, each of the connectors extends circumferentially across one of the legs.

7. The friction plate as recited in claim 6 wherein each of the connectors pierces two adjacent friction material segments of the friction material segments.

8. The friction plate as recited in claim 5 wherein each of the legs are located between two adjacent cutouts of the cutouts.

9. The friction plate as recited in claim 5 wherein the core plate includes an axial surface, each of the legs including a recessed groove receiving a head of one of the connectors, the heads being flush with the axial surface.

10. The friction plate as recited in claim 5 wherein the at least one connector is a plurality of connectors, each of the friction material segments being axially held in place by at least one of the connectors radially held in place by the respective cutout in which the friction material segment is received.

11. A method of forming a friction plate for a clutch comprising:
    attaching a plurality of distinct and separate friction material segments to a core plate including a plurality of cutouts extending axially therethrough by inserting each of the friction material segments into one of the cutouts and affixing the friction material segments in place with at least one connector to form a mechanical connection between the friction material segments and the core plate.

12. The method as recited in claim 11 wherein the at least one connector is a plurality of staples.

13. The method as recited in claim 11 wherein the at least one connector is plurality of connectors, the affixing of the friction material segments in place including piercing each of the friction material segments with at least one of the connectors.

14. The method as recited in claim 13 wherein the piercing each of the friction material segments with at least one of the connectors includes piercing each of the friction material segments with two of the connectors.

15. The method as recited in claim 13 wherein each of the connectors pierces two of the frictional material segments.

16. A friction plate for a clutch comprising:
a core plate including a plurality of cutouts extending axially therethrough;
a plurality of friction material segments, each of the segments being received in one of the cutouts; and
a plurality of staples affixing the frictional material segments in place in the cutouts to form a mechanical connection between the friction material segments and the core plate.

17. The friction plate as recited in claim 16 wherein each of the staples includes a head, a radially inner leg and a radially outer leg, each of the staple heads extending circumferentially and radially from the radially inner leg to the radially outer leg.

18. The friction plate as recited in claim 16 wherein the core plate includes a radially inner ring, a radially outer ring and a plurality of legs extending radially from the radially inner ring to the radially outer ring, the radially inner ring, a radially outer ring and the legs defining the cutouts.

19. The friction plate as recited in claim 18 wherein each of the staples extends circumferentially across one of the legs.

20. The friction plate as recited in claim 19 wherein each of the staples pierces two adjacent friction material segments of the friction material segments.

* * * * *